United States Patent
Chaney et al.

(10) Patent No.: US 6,191,781 B1
(45) Date of Patent: Feb. 20, 2001

(54) TELEVISION GRAPHICAL USER INTERFACE THAT COMBINES ELECTRONIC PROGRAM GUIDE WITH GRAPHICAL CHANNEL CHANGER

(75) Inventors: Jack Chaney, Gilroy; Steve Blonstein, Palo Alto; Michael Deacon, Campbell; Dimitry Nasledov, Sunnyvale, all of CA (US)

(73) Assignee: Samsung Electronics, Ltd., San Jose, CA (US)

( * ) Notice: Under 35 U.S.C. 154(b), the term of this patent shall be extended for 0 days.

(21) Appl. No.: 08/720,500

(22) Filed: Sep. 30, 1996

Related U.S. Application Data

(60) Provisional application No. 60/023,904, filed on Aug. 14, 1996.

(51) Int. Cl.[7] .............................. H04N 5/445; H04N 5/50
(52) U.S. Cl. ..................... 345/327; 348/553; 348/564; 348/569; 348/906; 345/342; 345/158; 455/4.2; 455/5.1
(58) Field of Search ...................... 348/569, 563, 348/564, 589, 570, 906, 6, 7, 10, 12, 13, 553; 455/5.1, 6.2, 6.1, 4.2; 345/327, 342

(56) References Cited

U.S. PATENT DOCUMENTS

| | | | |
|---|---|---|---|
| 4,139,865 | * | 2/1979 | Iida et al. .............................. 348/569 |
| 5,045,843 | | 9/1991 | Hansen ................................. 340/709 |
| 5,198,901 | | 3/1993 | Lynch .................................. 358/136 |
| 5,293,229 | | 3/1994 | Iu ........................................ 348/415 |
| 5,311,310 | | 5/1994 | Jozawa ................................ 348/416 |
| 5,359,348 | | 10/1994 | Pilcher ................................ 345/158 |
| 5,361,105 | | 11/1994 | Iu ........................................ 348/699 |
| 5,386,234 | | 1/1995 | Veltman .............................. 348/409 |
| 5,400,076 | | 3/1995 | Iwamura ............................. 348/416 |
| 5,489,947 | | 2/1996 | Cooper ................................ 348/589 |
| 5,524,195 | * | 6/1996 | Clanton, III ......................... 395/155 |
| 5,585,866 | * | 12/1996 | Miller et al. ........................ 348/570 |
| 5,594,509 | * | 1/1997 | Florin ................................. 348/565 |
| 5,619,249 | * | 4/1997 | Billock .................................... 348/7 |
| 5,699,125 | * | 12/1997 | Rzeszewski et al. ............... 348/563 |
| 5,710,601 | * | 1/1998 | Marshall et al. .................... 348/564 |
| 5,731,844 | * | 3/1998 | Rauch ................................. 348/564 |
| 5,828,839 | * | 10/1998 | Moncreiff ........................ 395/200.34 |
| 5,835,156 | * | 11/1998 | Blonstein et al. ................... 348/569 |
| 5,955,988 | * | 1/2000 | Blonstein et al. ................... 348/569 |
| 5,978,043 | * | 11/1999 | Blonstein et al. ................... 348/906 |
| 6,016,144 | * | 1/2000 | Blonstein et al. ................... 348/564 |

\* cited by examiner

*Primary Examiner*—Mark R. Powell
*Assistant Examiner*—Wesner Sajous
(74) *Attorney, Agent, or Firm*—Kenneth L. Sherman, Esq.; Sherman & Sherman; Jeffrey P. Aiello

(57) ABSTRACT

A graphical user interface (GUI) for a TV receiver combines a graphical channel changer with an electronic program guide to enable a user to quickly and seamlessly go from a TV channel selection mode to a TV program selection mode. The graphical channel changer includes a vertical bar composed of channel boxes that contain number and logos of available TV channels. The user may tune the TV system to any one of the TV channels by directing a remote pointing device at the channel box that represents that TV channel. When the user switches to the program selection mode, the GUI transfers to the electronic program guide for displaying vertical program bars arranged in alignment with the channel boxes to show information on TV programs for the TV channels represented by the corresponding channel boxes. Thus, the arrangement of the electronic program guide enables the user to review TV programming information, and then, to select a TV channel that carries a desired TV program by directing the remote pointing device at the channel box for the selected TV channel.

20 Claims, 8 Drawing Sheets

| CLUT location | Red byte | Green Byte | Blue Byte | Output Color |
|---|---|---|---|---|
| S0 | S0 | S0 | S0 | Black |
| S1 | Sff | S0 | S0 | Full Red |
| S2 | S80 | S0 | S0 | Half Red |
| S3 | S40 | S0 | S0 | Dim Red |
| S4 | Sff | Sff | Sff | White |
| S5 | S80 | S80 | S80 | Med. gray |
| S6 | S00 | Sff | S00 | Full Green |
| S7 | S00 | S00 | Sff | Full Blue |
| S8 | S00 | Sff | Sff | Cyan |
| etc | etc | etc | etc | etc |

FIG. 3

TELEVISION GRAPHICAL USER INTERFACE THAT COMBINES ELECTRONIC PROGRAM GUIDE WITH GRAPHICAL CHANNEL CHANGER

This application claims the benefit of U.S. Provisional Application Ser. No. 60/023,904 filed Aug. 14, 1996.

TECHNICAL FIELD

The present invention relates to television (TV) systems, and in particular, to a TV graphical user interface (GUI) that combines an electronic program guide with a graphical channel changer to facilitate user access to TV programs and services.

BACKGROUND ART

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

As discussed above, the digital satellite television system may provide about 1,000 TV channels with various TV programs and services. Therefore, it would be desirable to provide a graphical user interface (GUI) on a TV screen that would facilitate user access to available TV programs and services.

Also, it would be desirable to provide a TV GUI that would combine an electronic program guide with a graphical channel changer to enable a user to quickly and seamlessly switch between a TV channel selection mode and a TV program selection mode.

DISCLOSURE OF THE INVENTION

Accordingly, one advantage of the present invention is in providing a graphical user interface (GUI) on a TV screen that would facilitate user access to numerous TV programs and services offered by TV program providers.

Another advantage of the present invention is in providing a TV GUI that would combine an electronic program guide with a graphical channel changer to enable a user to quickly and seamlessly switch between a TV channel selection mode and a TV program selection mode.

The above and other advantages of the invention are achieved, at least in part, by providing a television system that comprises a CPU, and a TV monitor controlled by the CPU for displaying a graphical channel changer in a first mode. The graphical channel changer has graphical channel objects that enable a user to select a TV channel by directing a remote pointing device at the graphical object that defines the selected TV channel. In a second mode, the TV monitors displays an electronic program guide that includes the graphical channel objects.

In accordance with a first aspect of the invention, the electronic program guide contains a schedule of TV programs for a predetermined time period. The electronic program guide may be aligned with the graphical channel changer. When the user switches from the first mode to the TV second mode, the graphical channel changer is transformed into the electronic program guide.

The user may direct the remote pointing device at a guide graphical option in the graphical channel changer to transform the graphical channel changer into the electronic program guide. Alternatively, the remote pointing device may comprise a guide button for transforming the graphical channel changer into the electronic program guide.

In accordance with a preferred embodiment of the present invention, the graphical channel changer comprises a graphical channel bar composed of graphical channel objects for defining various TV channels. The graphical channel objects may contain logos and number of the corresponding TV channels. When the user switches into the TV program selection mode, the electronic program guide is displayed by the TV monitor simultaneously with the graphical channel bar.

For example, the electronic program guide may comprise graphical program bars containing information on TV programs carried by various TV channels. Each graphical program bar is aligned with the graphical channel object that defines the corresponding TV channel.

In accordance with another aspect of the invention, the TV system further comprises a radio-frequency tuner for tuning the TV system to frequency of a selected TV channel. The CPU issues a tune command to tune the radio-frequency tuner to the selected TV channel when the user directs the remote pointing device at a selected graphical channel object defining the selected TV channel.

In accordance with a further aspect of the invention, to facilitate user access to the TV GUI, the position of the cursor on the TV monitor is checked. When the cursor is in a predetermined position, a graphical object displayed in that predetermined position changes its color.

In accordance with a method of the present invention, the following steps are carried out for switching from the TV channel selection mode to the TV program selection mode:

displaying the graphical channel selector containing graphical channel objects for defining a group of TV channels, and drawing TV program information bars containing TV program information for the group of TV channels. Each program information bar that contains TV program information for a particular TV channel is simultaneously displayed and aligned with a graphical channel object defining this TV channel.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look up table.

BEST MODE FOR CARRYING OUT THE INVENTION

The best mode for practicing the invention is based on the realization of a satellite receiver in a digital satellite television system. However it is to be understood that the present invention is applicable to any system for receiving TV signals.

Figure 1:
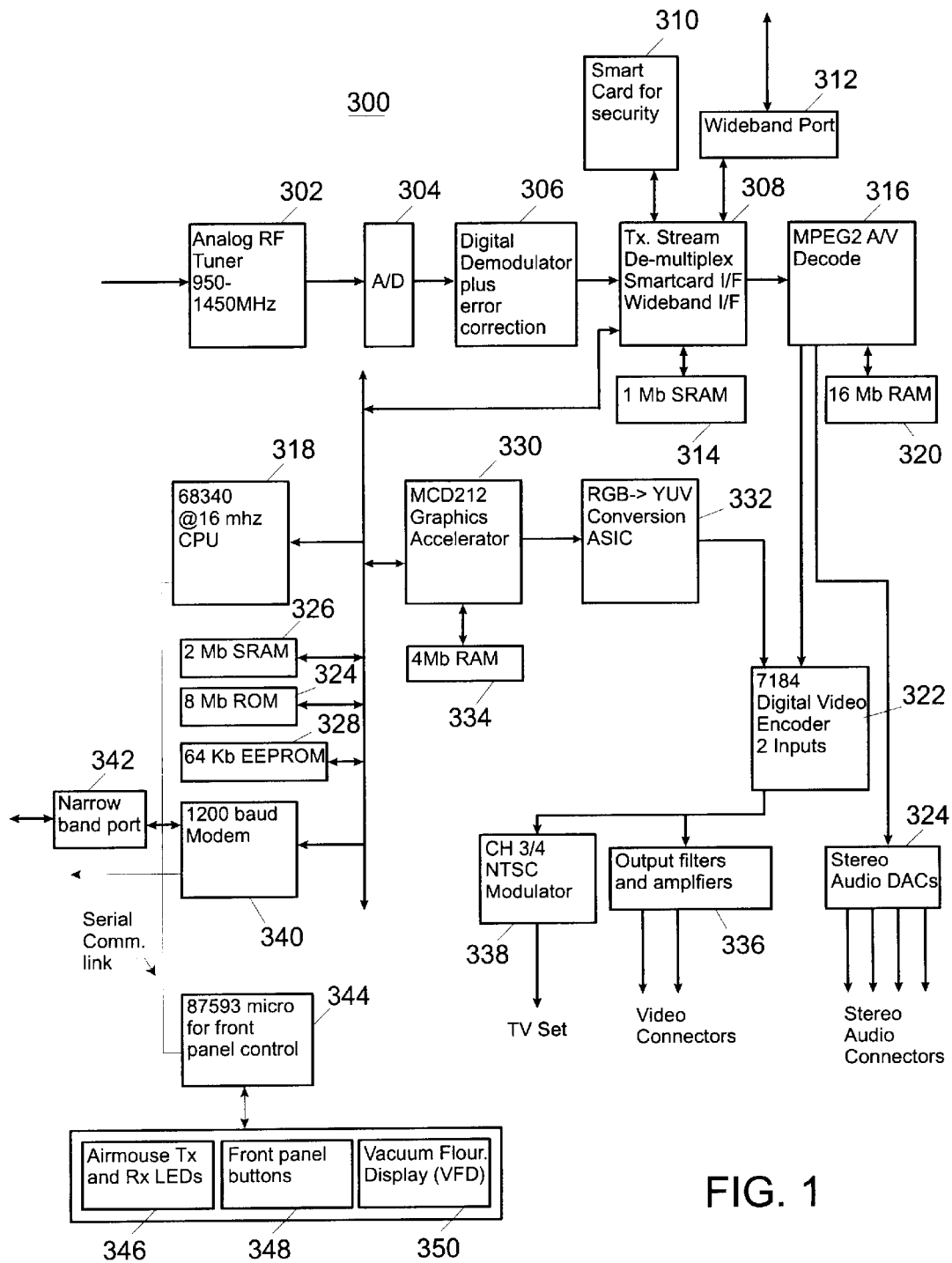
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302, which is equipped with a local oscillator and mixer, selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310 such as a Smart Card manufactured by the News Data Corporation controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 324 for converting digital audio signals into analog form. A single-chip AK4319 DAC manufactured by Asahi Kasei may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus, and a 32-bit data bus for internal operations. The CPU 318 may run the PSOS+ operating system developed by Integrated Systems Inc.

The CPU 318 is supported by a ROM 324, a SRAM 326, and an EEPROM 328. The ROM 324 that holds the PSOS+ operating system, menus, fonts, and other fixed data may be formed by two 4 Mbit masked ROM chips organized as 512K×8 with access speed of 95 ns.

The SRAM 326 formed, for example, by two 1 Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330 such as a MCD212 graphics accelerator manufactured by Motorola is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4 Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses on screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340 such as a single-chip SSI 1200-baud modem is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation.

For example, the pointing device interface 346 may comprise an infrared (IR) transmitter and receiver that provide infrared communications with a pointing device located up to 7 meters away from the receiver 300 at an angle up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there is no menu on the screen, a first click provides a basic control menu bar of menus across the bottom of the screen. The control menu bar remains active for a preset period, after which it is made invisible if no further signals from the pointing device are detected. Interactions between the GUI and remote pointing device are disclosed in more detail in our copending application Ser. No. 08/720,501, entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel controls 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
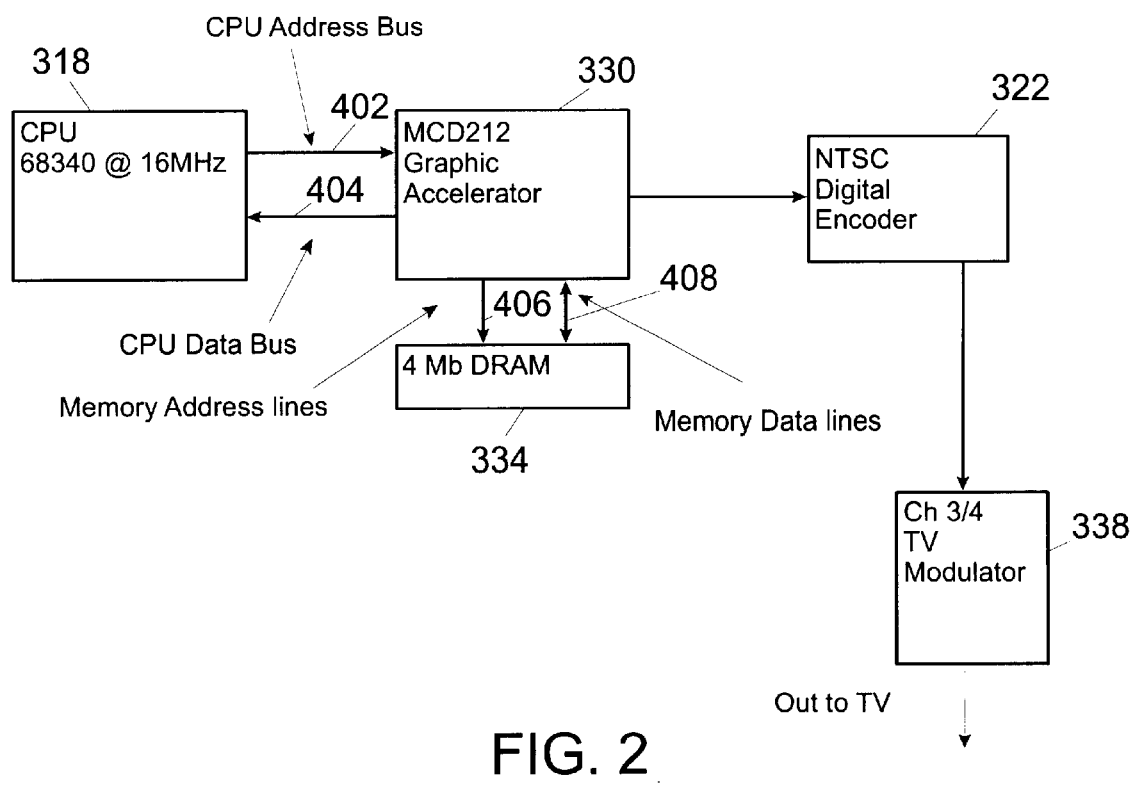
FIG. 2 is a block diagram illustrating a graphical object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402, and a 16-bit data bus 404. The 24-bit address bus 402 enables the CPU 318 to address up to 16 Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4 Mbit or 512 Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512 Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
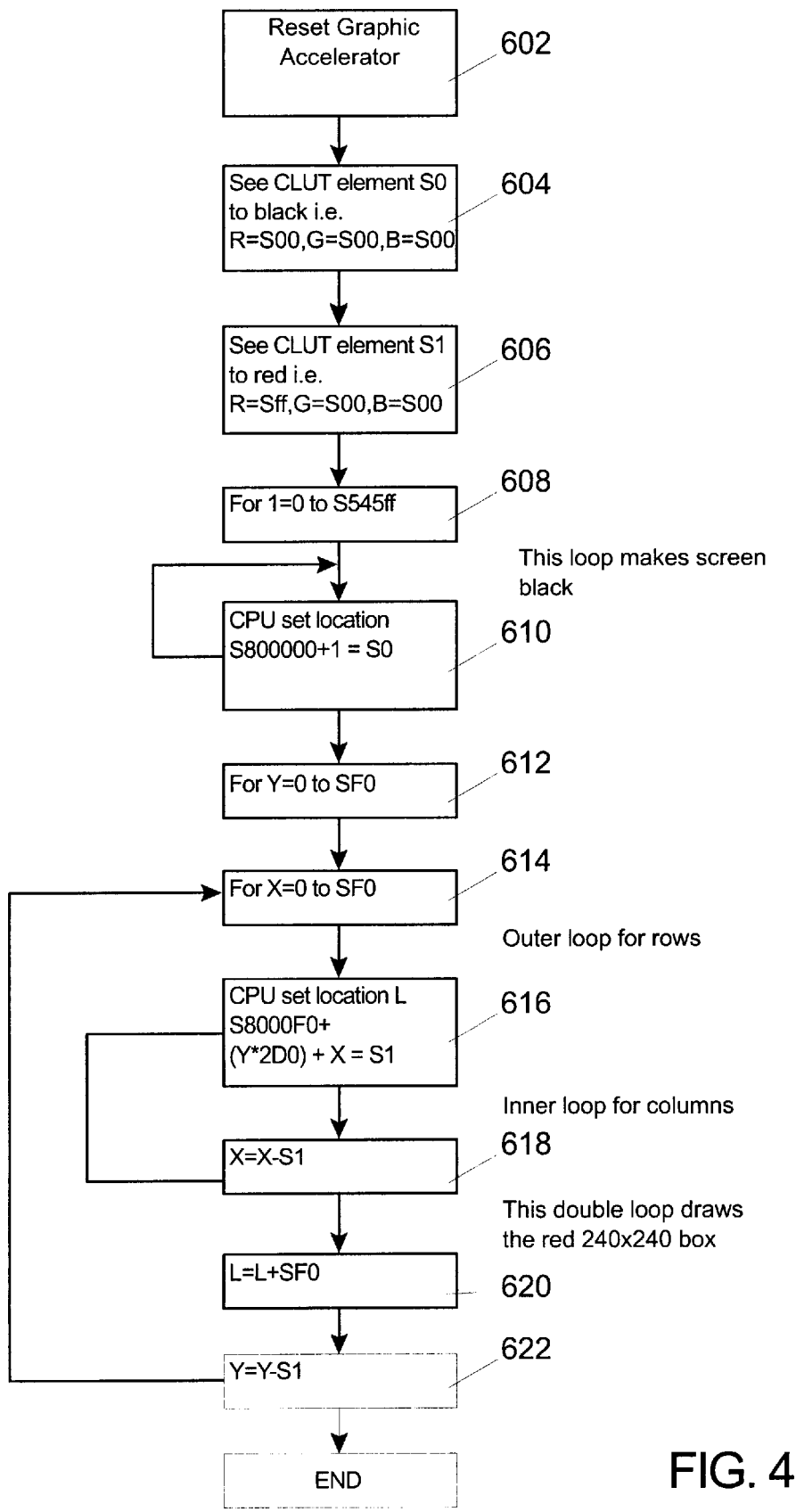
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

The GUI displayed on the TV screen may operate in two distinct functional modes. Mode 1 that enables a user to select a TV channel is represented by a graphical channel changer displayed on the screen. In addition to providing the user with TV channel selection capabilities, the graphical channel changer offers a gateway to mode 2 that enables the user to select TV programs carried by various TV channels. The mode 2 is represented by an electronic program guide displayed on the screen to show a schedule of TV programs for various TV channels. In both functional modes, graphical objects displayed on the TV screen are represented by a 2-dimensional array of pixels.

Figure 5:
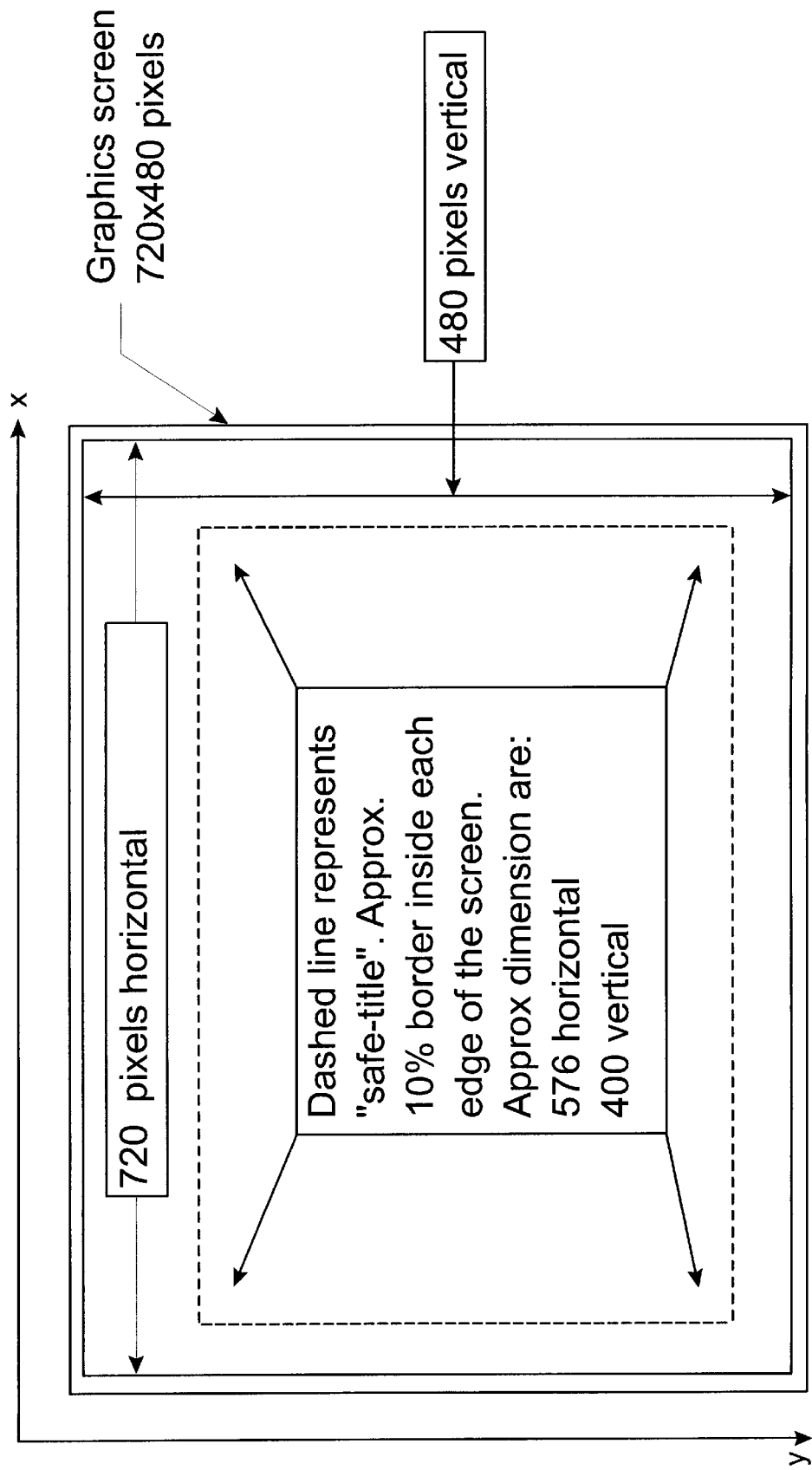
FIG. 5 is a diagram illustrating arrangement of pixels on a TV screen.

For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 5, the safe title area contains approximately 576 pixels in the horizontal direction, and 400 pixels in the vertical direction. With such a scheme, the top left hand corner of the safe title area is located at position X=72, Y=40. The bottom right hand corner of the safe title area has coordinates X=648, Y=440. On the discussed below diagrams that illustrate the functional modes of the GUI, an outer solid-lined box represents the edge of the TV screen, and a dash line shows the border of the safe title area.

Figure 6:
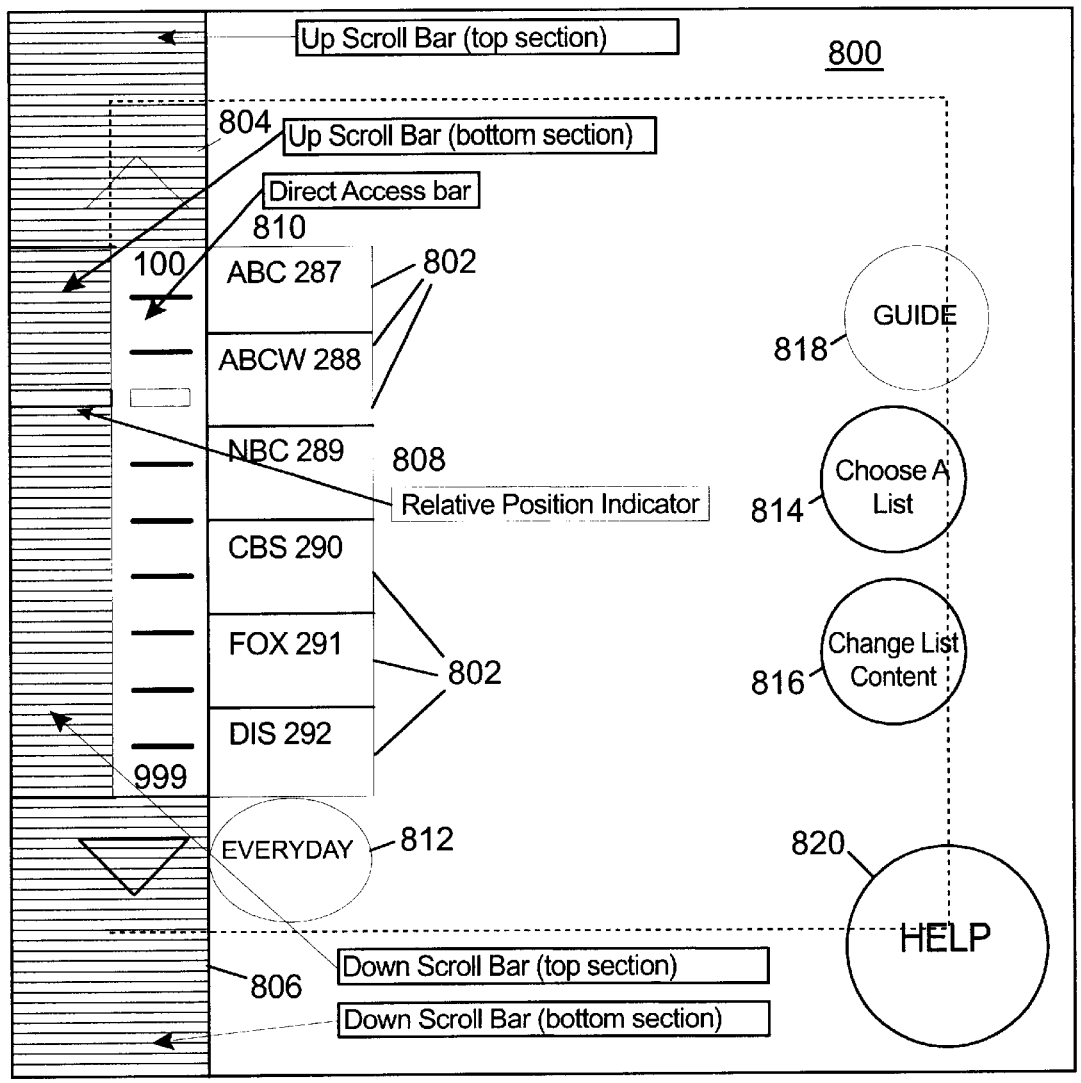
FIG. 6 is a diagram illustrating the TV screen in a TV channel selection mode.

Referring to FIG. 6, when the TV GUI of the present invention is placed in mode 1 that enables users to select TV channels, a TV set coupled to the satellite receiver 300 displays a graphical channel changer 800 having a vertical channel bar that includes graphical channel boxes 802 representing TV channels available in the satellite receiver 300. For example, each box 802 may contain number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented by 120×300 pixels. For example, its top left corner may have coordinates X=122, Y=90, and its bottom right corner may be arranged at X=242, Y=390.

Up and down scroll bars 804 and 806 may be arranged near the channel bar to allow a user to move up and down through the entire list of TV channels. For example, the scroll bars 804 and 806 shown in FIG. 6 represent channels 100 through 999. A single click of the pointing device button causes the channel changer 800 to move up or down by one channel with respect to the TV channels currently represented in the channel boxes 802. For example, when the user clicks the pointing device held in the direction of the up scroll bar 804, the top box 802 will shift from channel 287 to channel 288, and the bottom box 802 will move to channel 293. If the pointing device points at the down scroll bar 806, a single click will cause the top and bottom boxes 802 to move to channels 286 and 291, respectively. Holding down the pointing device button may cause the list of TV channels to scroll continuously. A relative position indicator 808 shows the position of the TV channels currently displayed in the channel boxes with respect to other TV channels.

It may be difficult to find a required channel among 1,000 channels provided by satellite TV, when the user does not know the number of the required channel. A direct access channel bar 810 presented next to the channel bar causes the channel changer 800 to display in the channel boxes a selected region of the channel bar around the required channel by directing the pointing device at the selected region.

The graphical channel changer 800 allows the user to include any combination of TV channels into a channel list to be displayed. An oval object 812 may be arranged below the channel bar to indicate the name of the currently selected channel list. Graphical buttons Choose a List and Change List Content 814 and 816, respectively, allow the user to select a channel list and to change the contents of the list.

When the user directs the remote pointing device at a graphical button GUIDE 818, the graphical channel changer 800 is transformed into the electronic program guide, as discussed in more detail later. A graphical button HELP 820 causes the TV GUI to switch into a help mode to assist the user in navigating through graphical options. Each component of the graphical channel changer may be displayed using the above-discussed procedure of drawing color graphic objects on a TV screen.

To switch the TV set to a required TV channel, the user directs the pointing device at the graphical channel box 802 that contains the number and logo of the required channel. The movement of the pointing device held in the user's hand cause the cursor to move to the required graphical channel box 802. The coordinates of the pointing device may be supplied to the microcontroller 344 on a periodic basis, for example, 60 times a second. The CPU 318 generates X, Y coordinates corresponding to a path for moving the cursor in alignment with the pointing device movement. Cursor movement is achieved by multiple erasures and redraws of the cursor image performed on the path to the selected position. When the required cursor position is reached, the user may press a select button on the pointing device to tune to the required channel. In response to the user command, the CPU 318 sends a tune command to the RF tuner 302 to tune the satellite receiver 300 to the required TV channel.

When the user moves the cursor over any of the graphical buttons, they change color to show to the user that the corresponding button is active and if clicked on will cause the system to perform the required task. When the cursor passes over any channel box 802, that box will be highlighted.

Figure 7:
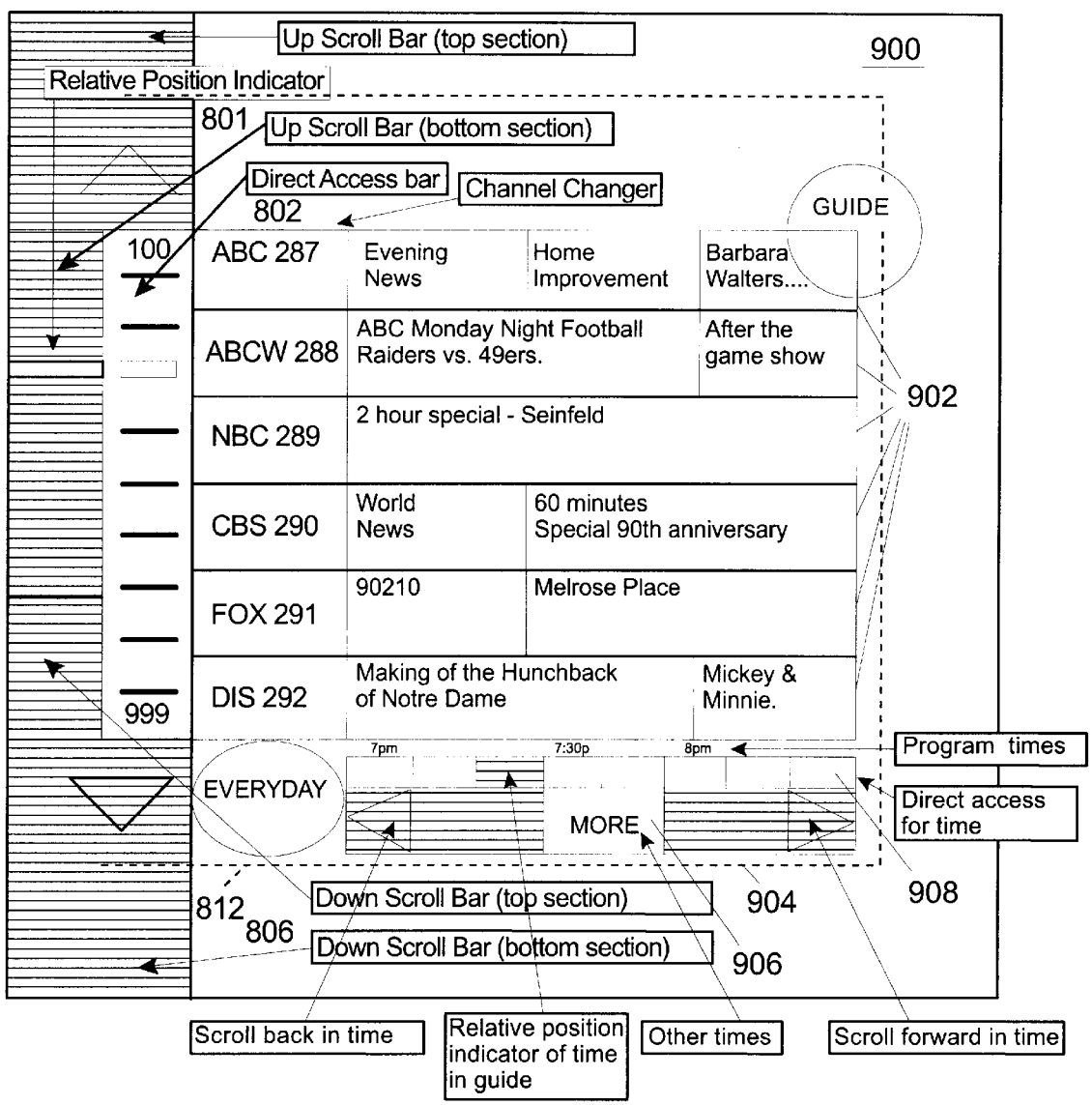
FIG. 7 is a diagram illustrating the TV screen in a TV program selection mode.

Reference is now made to FIG. 7 that illustrates mode 2 that enables users to view TV programming information for various TV channels in order to select required TV programs. In this mode, the TV GUI of the present invention displays an electronic program guide 900 based on the vertical channel bar of the graphical channel changer 800. This arrangement allows users to review TV programming information, and then, to select a TV channel that carries a desired TV program by directing the remote pointing device at the channel box 802 for the selected TV channel.

In addition to the vertical channel bar, the program guide 900 comprises horizontal program bars 902 that indicate TV programs carried by TV channels during a predetermined time period. For example, ninety minutes of programming may be shown. Each horizontal program bar 902 is aligned with the channel box 802 representing the TV channel that carries the TV programs indicated in that program bar 902. Below the horizontal bars 902 are time legends that indicate the time of the TV programs represented by the horizontal bars 902. For example, the electronic program guide 900 shown in FIG. 7 contains TV programming from 7 p.m. to 8.30 pm.

A horizontal time scroll bar 904 may be arranged below the time legends to enable the user to look at a TV program schedule before and after the time indicated by the time legends. A graphical button MORE 906 allows the user to select any time period for which a TV program schedule is required. A direct access time bar 908 similar to the direct access channel bar 810 enables the user to access a TV program schedule for a selected region of the time bar 908 by directing the pointing device at the selected region.

As shown in FIG. 7, the left hand side of the graphical channel changer 800 is unaltered. In addition to the vertical channel bar having channel boxes 802 aligned with corresponding horizontal program bars 902, the TV GUI operating in the mode 2 may maintain the up and down channel scroll bars 804 and 806, and the direct access channel bar 810.

Thus, the electronic program guide 900 is formed out of the graphical channel changer 800 when the TV GUI switches from the mode 1 into the mode 2. No redrawing of the vertical channel bar is performed to transform the graphical channel changer 800 into the electronic program guide 900. The two-dimensional program/time grid appears instantaneously aligned with the graphics for the channel changer. This allows the user to quickly and seamlessly go from the TV channel selection mode to the TV program selection mode, where the user may review TV programming information, and thereafter, select a TV channel that carries a desired TV program by directing the remote pointing device at the channel box 802 for the selected TV channel.

Figure 8:
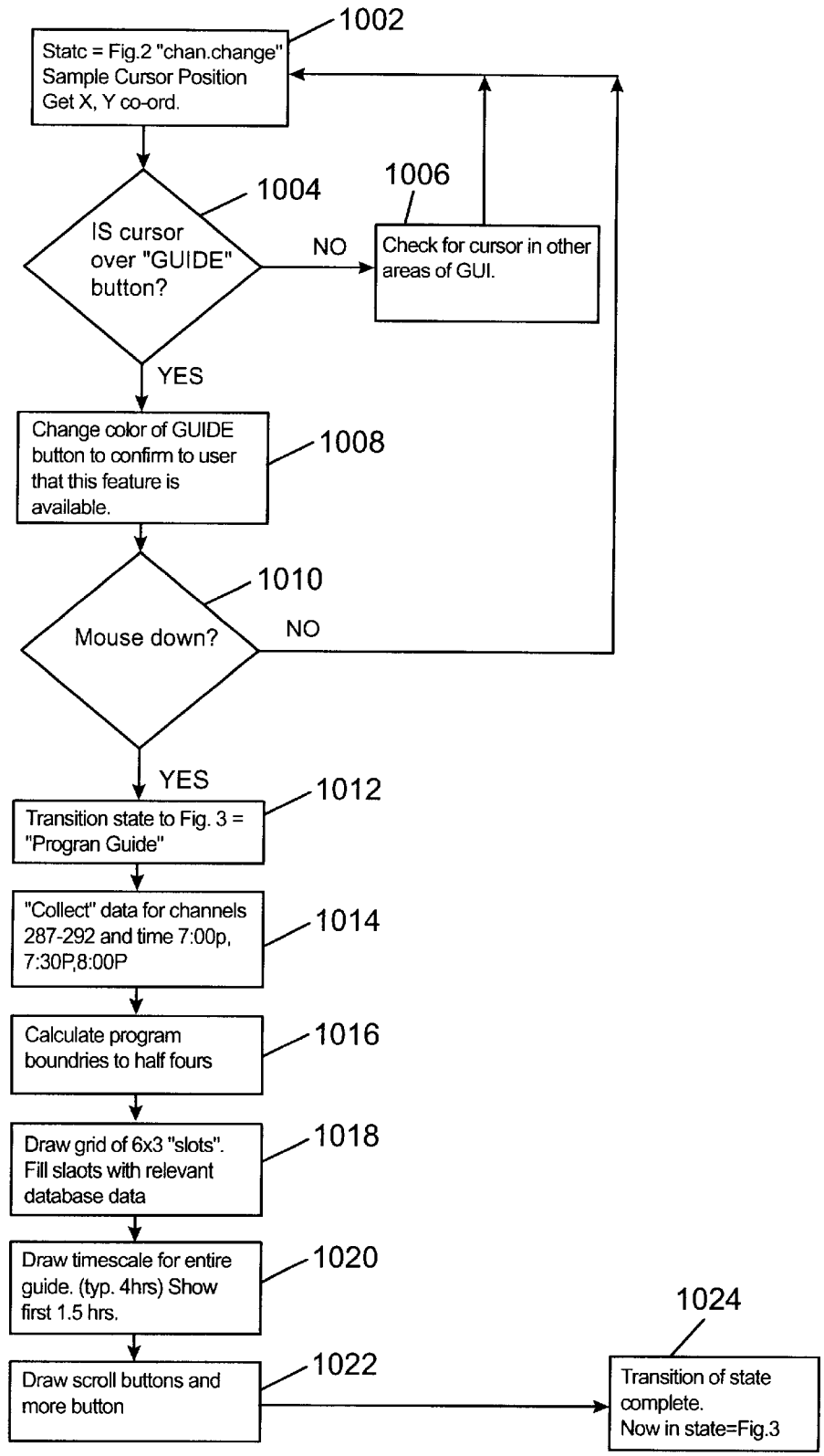
FIG. 8 is a flow chart illustrating transition from the TV channel selection mode to the TV program selection mode.

To switch between the modes of operation, the user may either push a GUIDE button on the remote pointing device, or direct the pointing device at the graphical GUIDE button 818 on the screen. Reference is now made to FIG. 8 showing a flow-chart that illustrates a transition from the graphical channel changer 800 to the electronic program guide 900 when the user points at the graphical GUIDE button 818. The mode transition in response to the GUIDE button on the remote pointing device is carried out in a similar way. In step 1002, when the GUI is set in mode 1 to display the graphical channel changer 800, the system checks a pointing device position to move the cursor in response to a position change, and generates X, Y coordinates defining cursor movement.

In step 1004, the system determines whether or not the cursor is over the GUIDE button. If not, step 1006 is carried out to check other areas of the GUI, and the system goes back to the step 1002. If the cursor is positioned over the GUIDE button, the color of this button is changed to confirm that this feature is available (step 1008).

In step 1010, the pointing device is checked to determine whether it is clicked. If not, the system returns to step 1002. If the pointing device is clicked, the transition to electronic program guide 900 commences (step 1012). In step 1014, the CPU 318 accesses an internal database of the current program guide to collect information on TV programs for the TV channels represented by the currently displayed channel boxes 802. For the graphical channel changer 800 illustrated in FIG. 6, information on TV programs for channels 287–292 is collected. The system requests TV program information for a predetermined time period starting from the current time which may be rounded to the nearest half-hour. For example, if the current time is 7:12 p.m., the programming from 7.00 p.m. to 8:30 p.m. may be requested. The internal database of the current program guide may be arranged in the EEPROM 328 or SRAM 326, and may contain information on TV programs for all TV channels for a preset time period starting from the current time, for example, for 4–8 hours. In step 1016, TV program boundaries are calculated for time slots of predetermined duration. For example, half-hour time slots may be used.

In step 1018, the system draws horizontal bars 902 aligned with the channel boxes 802 currently displayed in the graphical channel changer 800. A horizontal program bar 902 for a particular TV channel is aligned with the channel box 802 representing that TV channel. Each drawn bar 902 contains a predetermined number of the time slots. For example, for 90-minute TV programming, the horizontal bar 902 for each TV channel includes 3 half-hour time slots.

As illustrated in FIG. 7, the horizontal program bars 902 for TV channels 287–292 are aligned with the channel boxes 802 having numbers and logos of these channels. The displayed time slots are filled with corresponding information on TV programs from the internal database of the current program guide.

In step 1020, the time bar 908 is drawn for a preset time period, for example, for 4 hours. TV program information for a portion of this time period, for example, for 1.5 hours is displayed in the horizontal bars 902. In step 1022, the system draws the horizontal time scroll bar 904 and the MORE button 906. In step 1024, the transition to mode 2 is completed.

All graphical objects in the graphical channel changer 800 and electronic program guide 900 are generated using the graphics drawing procedure described in connection with FIGS. 2–4. As discussed above, the NTSC encoder 322 that encodes a video signal, together with graphics data, produces a combined composite TV signal for placing graphics on top of a video on the TV screen.

There accordingly has been described a TV graphical user interface that combines a graphical channel changer with an electronic program guide to enable a user to quickly and seamlessly go from a TV channel selection mode to a TV program selection mode. The graphical channel changer includes a vertical bar composed of channel boxes that contain number and logos of available TV channels. The user may tune the TV system to any one of the TV channels by directing a remote pointing device at the channel box that represents that TV channel. When the user switches to the program selection mode, the GUI transfers to the electronic program guide for displaying vertical program bars arranged in alignment with the channel boxes to show information on TV programs for the TV channels represented by the corresponding channel boxes. Thus, the arrangement of the electronic program guide enables the user to review TV programming information, and then, to select a TV channel that carries a desired TV program by directing the remote pointing device at the channel box for the selected TV channel.

In this disclosure, there are shown and described only the preferred embodiments of the invention, but it is to be understood that the invention is capable of changes and modifications within the scope of the inventive concept as expressed herein.

What is claimed is:
1. A television (TV) system comprising:
   a CPU, and
   a TV monitor controlled by said CPU for displaying in a first mode, a graphical channel changer having graphical options for enabling a user to select a TV channel by directing a remote pointing device at said graphical options, and providing a facilitated transition for displaying in a second mode, an electronic TV program guide including said graphical options;
   said electronic TV program guide contains a schedule of TV programs for TV channels defined by said graphical options;
   said electronic TV program guide is aligned with said graphical channel changer; and said graphical channel changer is instantaneously and directly transformed into said electronic TV program guide.

2. The system of claim 1, wherein said graphical channel changer comprises a guide graphical option for providing transition into said electronic TV program guide.

3. The system of claim 2, wherein the user directs the remote pointing device at said guide graphical option to transform said graphical channel changer into said electronic TV program guide.

4. The system of claim 1, wherein said remote pointing device comprises a guide button for transforming said graphical channel changer into said electronic TV program guide.

5. The system of claim 1, wherein said graphical channel changer comprises a graphical channel bar containing graphical channel objects for defining various TV channels.

6. The system of claim 5, wherein said electronic TV program guide is displayed by said TV monitor simultaneously with said graphical channel bar when said graphical channel changer is being transformed into said electronic program guide.

7. The system of claim 6, wherein said electronic TV program guide comprises graphical program bars containing information on TV programs carried by various TV channels that can be selected in the graphical channel changer mode.

8. The system of claim 7, wherein a graphical program bar that contains TV program information for a TV channel is aligned with a graphical channel object that defines the TV channel and can function in the selection of the TV channel.

9. The system of claim 5, wherein said graphical channel objects contain logos of the TV channels and can function in the selection of the TV channel.

10. The system of claim 5, the graphical channel changer further comprising a radio-frequency tuner for tuning the TV system to frequency of a selected TV channel.

11. The system of claim 10, wherein said CPU issues a tune command to tune said radio-frequency tuner to said selected TV channel when the user directs the remote pointing device at a selected graphical channel object defining said selected TV channel.

12. In a television system having a graphical channel selector displayed on a TV monitor for enabling a user to select a TV channel among a plurality of TV channels, and a graphical program guide displayed on the TV monitor for showing a schedule of TV programs, a method of transition from said graphical channel selector to said graphical program guide comprising the steps of:

displaying said graphical channel selector containing graphical channel objects for defining a group of TV channels to enable the user to tune the television system to a selected TV channel by directing a pointing device to a graphical channel object for the selected TV channel, and drawing program information bars containing TV program information for said group of TV channels, each program information bar containing TV program information for a TV channel being simultaneously displayed and aligned with the graphical channel object defining this TV channel, allowing the selection of a specific TV channel through the selection of said graphical channel object.

13. The method of claim 12, further comprising the steps of:

checking position of a cursor on said TV monitor, and if the cursor is in a predetermined position, automatically changing color of a graphical object displayed in said predetermined position.

14. A graphical user interface displayed on a screen of a monitor, comprising:

a channel selector having channel objects for defining TV channels, and enabling a user to switch a TV receiver to a selected TV channel by directing a pointing device at a channel object defining said selected channel, and a TV program guide containing program objects for showing TV program information for the TV channels in a TV program selection mode, each program object for a TV channel being simultaneously displayed on the screen and aligned with the channel object for this TV channel.

15. The graphical user interface of claim 14, wherein said channel selector is represented by a vertical bar composed of channel boxes that represent said channel objects.

16. The graphical user interface of claim 15, wherein said program objects are represented by horizontal program bars aligned with the channel boxes for corresponding TV channels and allow tuning to said TV channels thereby.

17. The graphical user interface of claim 16, further comprising a horizontal time bar for indicating time intervals for the TV program information contained in the program objects that may be selected through the use of the graphical channel changer.

18. The system of claim 1, wherein said graphical options of said graphical channel changer enable a user to control said TV monitor to display the TV channel selected by the user.

19. The graphical user interface of claim 14, wherein said channel selector operates for switching the TV receiver to the selected channel in response to said pointing device.

20. The graphical user interface of claim 14, wherein said interface operates in two modes including:

a first mode wherein the interface includes a display of the channel selector and wherein the display includes a plurality of channel objects for selection by the user to switch the TV receiver, and a second mode wherein the display further includes a picture of the TV program guide for the plurality of channel objects being displayed in the channel selector.

* * * * *